(12) United States Patent
Nieh et al.

(10) Patent No.: US 6,287,711 B1
(45) Date of Patent: Sep. 11, 2001

(54) WEAR-RESISTANT COATING AND COMPONENT

(75) Inventors: Simon Kai-Wei Nieh, Monrovia; Su-Jen Ting, Stevenson Ranch; Cai-Zhong Zhang, Alhambra, all of CA (US)

(73) Assignee: Front Edge Technology, Inc., Baldwin Park, CA (US)

( * ) Notice: Subject to any disclaimer, the term of this patent is extended or adjusted under 35 U.S.C. 154(b) by 0 days.

(21) Appl. No.: 09/108,852

(22) Filed: Jul. 1, 1998

(51) Int. Cl.$^7$ ................................................ B32B 15/04
(52) U.S. Cl. ...................... 428/627; 428/696; 428/697; 428/699; 428/623; 428/628; 428/457
(58) Field of Search ...................... 501/96.3; 428/696, 428/697, 699, 622, 623, 627, 628, 457, 698

(56) References Cited

U.S. PATENT DOCUMENTS

| | | |
|---|---|---|
| 4,459,328 | 7/1984 | Mizuhara ............................ 427/192 |
| 4,597,844 | 7/1986 | Hiraki et al. ...................... 204/192 C |
| 4,619,865 | * 10/1986 | Keem et al. . |
| 4,663,183 | 5/1987 | Ovshinsky et al. .................... 427/39 |
| 4,698,256 | 10/1987 | Giglia et al. .......................... 428/216 |
| 4,714,660 | * 12/1987 | Gates, Jr. . |
| 4,725,345 | 2/1988 | Sakamoto et al. ............... 204/192.31 |
| 4,777,090 | 10/1988 | Ovshinsky et al. ................... 428/408 |
| 4,873,115 | 10/1989 | Matsumura et al. .................... 427/34 |
| 4,877,677 | 10/1989 | Hirochi et al. ....................... 428/216 |
| 4,904,542 | 2/1990 | Mroczkowski ....................... 428/610 |
| 4,996,079 | 2/1991 | Itoh ....................................... 427/39 |
| 5,249,554 | 10/1993 | Tamor et al. ..................... 123/90.51 |
| 5,330,853 | 7/1994 | Hofmann et al. .................... 428/697 |
| 5,368,939 | 11/1994 | Kawamura et al. .................. 428/408 |
| 5,490,911 | 2/1996 | Makowiecki et al. ........... 204/192.15 |
| 5,503,912 | 4/1996 | Setoyama et al. .................... 428/216 |
| 5,511,587 | 4/1996 | Miya et al. ........................... 139/192 |
| 5,547,767 | 8/1996 | Paidassi et al. ...................... 428/610 |
| 5,656,364 | 8/1997 | Rickerby et al. ..................... 428/216 |
| 5,670,252 | 9/1997 | Makowiecki et al. ............... 428/336 |
| 5,700,551 | * 12/1997 | Kukino et al. . |

* cited by examiner

Primary Examiner—Deborah Jones
Assistant Examiner—Wendy Boss
(74) Attorney, Agent, or Firm—Janah & Assoc., INc; Ashok K. Janah

(57) ABSTRACT

A wear-resistant component comprises a workpiece having a coating comprising at least one crystalline layer comprising metal boride and at least one amorphous layer comprising metal and boron. The amorphous layer can further comprise one or more of carbon, nitrogen, halogen, or hydrogen. Preferably, the coating comprises a plurality of composite layers, each composite layer comprises a crystalline titanium diboride layer and an amorphous layer comprising metal and boron. The wear-resistant component has a wear rate of $3.5 \times 10^{-6}$ mm$^3$/nm, which is about 250 times lower than that of an uncoated component.

34 Claims, 3 Drawing Sheets

WEAR-RESISTANT COATING AND COMPONENT

BACKGROUND

The present invention relates to a wear-resistant coating and component.

In production of tools, molds, and machine parts, various types of coatings have been applied to a substrate to improve properties such as hardness, wear resistance, corrosion resistance, lubricity, ductility, strength, and elasticity. Unfortunately, many of these properties are mutually exclusive for a given material. Thus one material or composition may possess good hardness but may not have lubricity or some other desirable property. For example, a coating of a boride, carbide, nitride or carbonitride of titanium, hafnium, or zirconium is very hard, but lacks lubricity or ductility, which is a desirable property for machine components. On the other hand, lubricious materials such as germanium and fluorocarbons do not possess sufficient hardness or wear resistance. Hard coating materials such as diamond-like carbon and titanium diboride are usually very brittle which limits their wear resistance. The high internal stress also prohibits depositing thick coating material which is crucial in some tribological applications such as wear reduction in hard particle erosion environment.

Multilayer coating technology is increasingly used in improving properties of tools and components because multiple layers of materials having different properties can be tailored to provide a particular combination of desirable and opposing properties such as for example, hardness, lubricity, and ductility. Suitable multilayer coatings include combinations of hard crystalline layers, such as TiC or TiN, and lubricative amorphous carbon layers. However, the amorphous carbon coating easily peels off from underlying TiC or TiN layer during or immediately after formation of the coating because of the high thermal and internal stress of the amorphous carbon layer and its poor compatibility with underlying TiC or TiN layer. Thus intermediate layers having complex compositions are required to adhere the TiC/TiN layer to the amorphous carbon layer or vice versa. These layers include graded composition layers which have a changing composition of carbon and TiC or TiN through their thickness. The graded composition layers are difficult to fabricate and often have undesirable properties of low hardness or lubricity.

Thus there is a need for a coating for a wear-resistant component that exhibits high hardness and wear resistance, as well as opposing properties of lubricity and ductility. There is a further need for a multilayer or multi-component coating that can be strongly adhered to a component. There is also a need for a method of making a wear-resistant component that efficiently and reliably coats the component with a hard and ductile coating.

SUMMARY

The present invention satisfies these needs by providing a hard, wear-resistant coating component including a coating comprising crystalline layers and amorphous layers. In one embodiment, the wear-resistant component comprises (a) a workpiece and (b) a coating on the workpiece, the coating comprising (i) a crystalline layer comprising metal boride and (ii) an amorphous layer comprising metal and boron. The crystalline layer comprises metal boride having the general formula $MeB_x$ where Me represents metal and x represents 1 to 4. The amorphous layer can further comprise one or more of carbon, nitrogen, halogen, or hydrogen. In another embodiment, the coating further comprises an interface layer between the crystalline layer and the amorphous layer, the interface layer comprising a variable stoichiometry of metal and boron that changes through the thickness of the interface layer.

The present invention further provides a method of making the hard, wear-resistant component, the method comprising the steps of:

(a) placing a workpiece into a process chamber having a target comprising metal boride;

(b) introducing a sputtering gas into the process chamber and forming a plasma from the sputtering gas to sputter the target and deposit a crystalline layer comprising metal boride on the workpiece; and (c) before or after step (b), introducing a reactive gas into the process chamber and maintaining process conditions suitable for depositing an amorphous layer comprising metal and boron on the workpiece.

The wear-resistant coating component provided by the present invention combines the extreme hardness of a crystalline layer with the self-lubricity and ductility of an amorphous layer to create a new family of hard and wear-resistant components.

DRAWINGS

These and other features, aspects, and advantages of the present invention will become better understood with reference to the following description, appended claims, and accompanying drawings where:

DESCRIPTION

Figure 1:
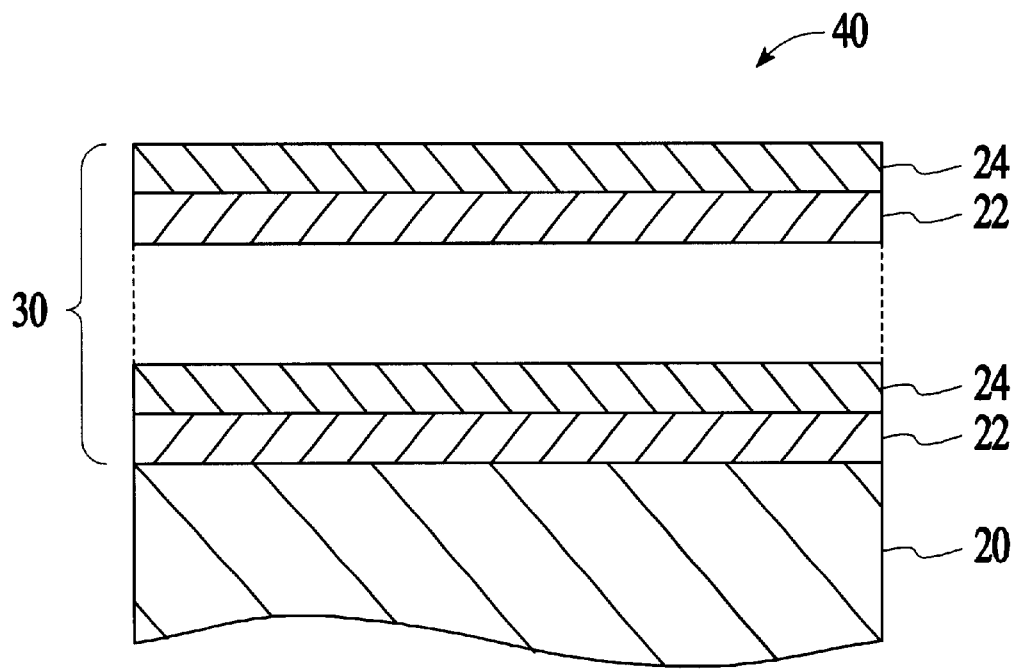
FIG. 1 is a partial sectional schematic view of an embodiment of the wear-resistant component according to the present invention.

As illustrated in FIG. 1, the wear-resistant component 40, according to the present invention, comprises a workpiece 20, and a coating 30 on the workpiece 20. The coating 30 comprises at least one crystalline layer 22 and at least one amorphous layer 24. The workpiece 20 useful in the present invention can comprise tools, molds, and machine parts, and can be made of metals, alloys, ceramics, or plastic. While the present invention is illustrated for wear-resistant components, the coating can also be used for other applications as would be apparent to one of ordinary skill, and the scope of the present invention should not be limited to the examples provided herein.

The crystalline layer 22 comprises a hard crystalline metal boride having a hardness on the order of 20 to 70 GPa. By boride it is meant a boride of any valence including for example, monoboride, diboride, triboride and tetraboride compounds. A suitable crystalline layer 22 comprises metal boride having the general formula $MeB_x$ where Me represents a metal comprising Fe, Ta, Ti, or Zr; and x represents 1 to 4. Preferably, the crystalline layer 22 comprises $Fe_2B$, TaB, $TiB_2$, or $ZrB_2$. It has been found that crystalline layer 22 are advantageous because they are stable, hard, oxidation-resistant, and electrically conductive. Preferably, the thickness of the crystalline layer 22 is from about 10 to about 5000 Å, and more preferably from about 100 to about 1000 Å.

The amorphous layer 24 is ductile and generally softer than the crystalline layer 22. The amorphous layer stops the continuous growth of the crystalline phase. The amorphous layer comprising metal and boron 24 can further comprise one or more of carbon, nitrogen, halogen, or hydrogen. A suitable amorphous layer comprising metal and boron 24 used in the present invention comprises amorphous titanium boride, iron boride, zirconium boride, tantalum boride, or mixtures thereof. Preferably, the amorphous layer 24 contains predominantly metal boride compound, such as $TiB_2$, in which the ratio of titanium to boron is mostly the stable stoichiometrical ratio of 1:2. Preferably, the boron content of the amorphous layer 24 is from about 10 at % to about 80 at %, and more preferably from about 20 at % to about 60 at %. A boron content in the amorphous layer 24 that is higher than 80 at % will result in poor self-lubricity and ductility and is impractical for applications wherein self-lubricity or wear resistance is required. On the other hand, a boron content of less than 10 at % will impair the hardness and wear resistance of the coating component 40. Preferably, the thickness of the amorphous layer 24 is from about 10 to about 5000 Å, and more preferably from about 100 to about 1000 Å.

Preferably, the crystalline layer 22 and the amorphous layer 24 are deposited as alternating layers, with or without intervening layers. It should be noted that the order of the crystalline layer 22 and the amorphous layer 24 can be reversed, the amorphous layer 24 being directly on or closer to the workpiece 20, and the crystalline layer 22 closer or nearer to the exterior of the coating. Also, interface layers having other properties can be positioned in between crystalline layers 22 and amorphous layers 24.

In one embodiment, the crystalline layer 22 and amorphous layer 24 are deposited directly over each other without any interface layer. The number of alternating crystalline layer 22 and amorphous layer 24, their microstructure, and the thickness of each layer can be varied to provide coatings having different tribological properties depending on the applications. A relatively small number of alternating layers may be sufficient to provide a high level of wear protection. In certain applications, a large number of layers are needed to provide a higher degree of wear resistance, each layer being from about 10 to about 5000 Å in thickness. More preferably, each individual layer has a thickness between 100 and 1000 Å to provide adequate wear protection.

In one preferred embodiment, a thin adhesion layer is deposited on the surface of the workpiece 20 before the crystalline and amorphous layer 22, 24 are formed, to increase compatibility of the coating with the workpiece 20. A suitable adhesion layer comprise a metal layer such as an elemental metal titanium, zirconium, or chromium. In this embodiment, the thickness of the adhesion layer is from about 200 to about 2000 Å, for a coating 30 comprising 4 to 500 alternating crystalline and amorphous layer 22, 24.

Figure 2:
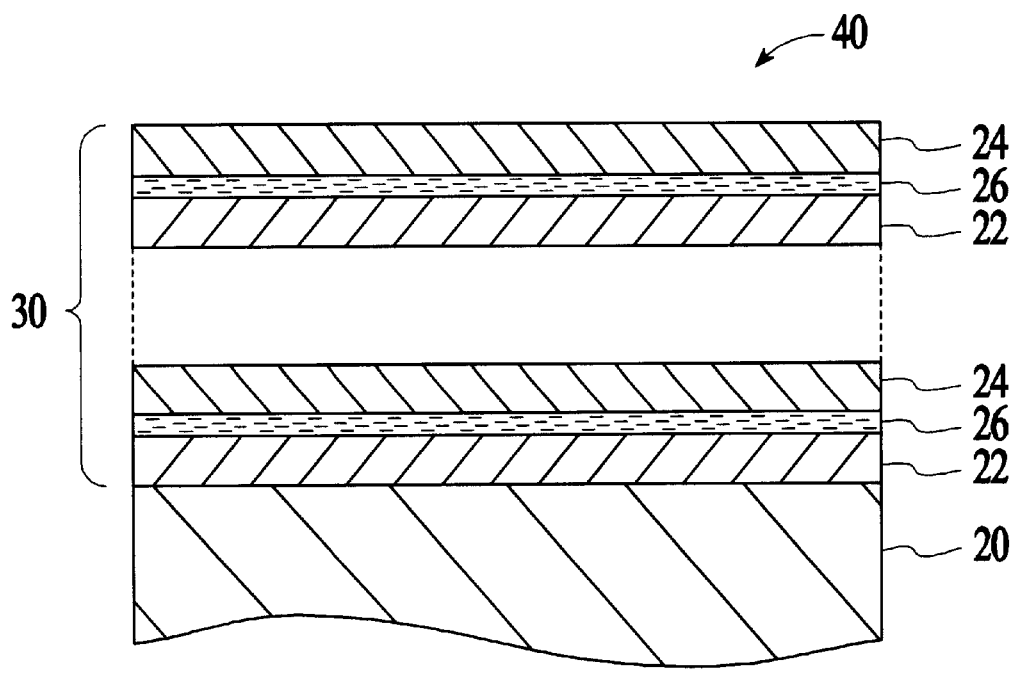
FIG. 2 is a partial sectional schematic view of another embodiment of the wear-resistant component according to the present invention.

When changing process conditions from the deposition of the crystalline layer 22 to deposition of the amorphous layer 24, as illustrated in FIG. 2, one or more interface layers 26 are formed between the crystalline layer 22 and the amorphous layer 24. The interface layers 26 are extremely thin at about 5 to 100 Å. The interface layers 26 typically contain metal boride compounds having variable stoichiometry.

The manufacture of the wear-resistant component 40 of the present invention is performed in a production-scale, three-chamber-in-line coating system which comprises at least one load/unload lock chamber and at least one process chamber for performing sputtering and deposition processes.

The process chamber comprises a process gas distributor for distributing process gas into the process chamber, such as for example, a sputtering gas for sputtering targets to deposit crystalline or amorphous layers 22, 24 onto the workpiece 20, or a reactive gas which can be incorporated into crystalline compound lattice and form an amorphous layer comprising metal and boron 24 on the workpiece 20. The gas distributor typically comprises at least four gas distribution manifolds to ensure uniform distribution of process gas in the chamber and provide uniform sputtering rate and deposition rate. Mass flow controllers and valves are used to control the flow of the process gas into the process chamber.

The process chamber also comprises one or more sputtering targets facing the workpiece 20. The targets have a sputtering surface comprising a sputtering material such as crystalline metal boride. Preferably, the chamber comprises at least two crystalline metal boride sputtering targets for uniformly producing and depositing crystalline layers comprising metal boride 22 on the workpiece 20. The sputtering targets are electrically isolated from the chamber so that the targets can be electrically biased with respect to the chamber wall to serve as a plasma generator that sustains a plasma for sputtering crystalline metal boride from the surface of the targets.

The plasma generator is also useful for generating a plasma for depositing an amorphous layer comprising metal and boron 24 on the workpiece 20. The plasma generator can generate a plasma by applying a DC or RF current to the sputtering targets. Typically, a DC voltage is applied to the crystalline metal boride sputtering targets, and the sidewalls of the chamber are electrically grounded to form an electric field in the chamber that ionizes the sputtering gas to form a sputtering plasma that sputters the targets. The sputtering targets comprise pure dense crystalline metal boride such as for example high density, crystalline $TiB_2$. Preferably, the sputtering targets have a sputtering surface with an area of from about 10 $in^2$ to about 200 $in^2$, and the thickness of the sputtering targets is from about ⅛" to 1".

In the fabrication process, a workpiece 20, such as a metal component, is initially cleaned and mounted on a rack. The rack is transported to a load lock chamber by a computerized conveyor system. The load lock chamber is maintained at a pressure of from $5 \times 10^{-5}$ to $5 \times 10^{-6}$ Torr, and the workpiece 20 is then preheated by an infrared heater to about 100° C. The preheated workpiece 20 is transported from the load lock chamber and positioned in the process chamber.

A sputtering gas is introduced into the process chamber, and a plasma is formed from the sputtering gas to sputter the target and to deposit a crystalline layer comprising metal boride 22 on the workpiece 20. Thereafter, during the deposition process, a reactive gas is introduced into the process chamber, and process conditions are maintained to deposit an amorphous layer comprising metal and boron 24 on the workpiece 20. The crystalline layer 22 and amorphous layer 24 are alternatively deposited onto the workpiece 20 using a multistage process, in which process conditions are changed in repeated cycles, to obtain one or the other material.

In the sputtering process step, a sputtering gas is introduced into the process chamber via a gas distributor. The chamber is maintained at process conditions suitable for sputtering crystalline metal boride targets and depositing a crystalline layer comprising metal boride on the workpiece. A suitable sputtering process gas comprises an inert gas such as argon, neon, or xenon. Preferably, argon is used as sputtering gas. The flow rate of the sputtering gas is selected to provide a partial pressure of 1.5 mTorr. The deposition rate is at least 50 Å/min, and more preferably at least about 250 Å/min. Preferably, the volumetric flow rate of the sputtering gas is from about 50 to about 250 sccm, more preferably from 80 to about 150 sccm. The chamber is maintained at a pressure ranging from about 1 mTorr to about 5 mTorr. A plasma is generated in the chamber by electrically biasing the sputtering targets using a DC bias and electrically grounding the chamber walls. The metal boride sputtering targets are bombarded by energetic plasma ions causing sputtered metal boride to be removed from the targets and deposited on the workpiece. Preferably, the desired thickness of the crystalline layer comprising metal boride 22 is deposited on the workpiece 20 in about 1 to about 5 minutes.

In the subsequent sputter and deposition process steps (in addition to the sputtering gas, Ar), a reactive gas is introduced into the same process chamber via a gas distributor, and the chamber is maintained at process conditions suitable for depositing an amorphous metal boride 24 on the workpiece 20. Preferably, the reactive gases for depositing an amorphous layer 24 comprise one or more of nitrogen, acetylene, methane, or argon. More preferably, nitrogen and acetylene are used. The flow rate of the reactive gas is selected to provide a partial pressure of $N_2$ or $C_2H_2$ from about 0.01 mTorr to about 10 mTorr, and more preferably from about 0.02 mTorr to about 1 mTorr. Preferably, the desired thickness of the amorphous layer comprising metal and boron 24 is deposited on the workpiece 20 in about 1 to about 5 minutes.

It should be noted that the sputtering and sputtering/deposition steps can be performed in any order. For example, first, reactive gas and sputtering gas are introduced into the process chamber and maintained at process conditions suitable for depositing an amorphous layer 24 on the workpiece 20. Thereafter, the reactive gas is pumped out of the process which is maintained at process conditions suitable for sputtering and depositing a crystalline layer 22 on the workpiece 20. In this process sequence, an amorphous layer 24 is first deposited on the workpiece 20 and then a crystalline layer 22 is deposited towards the exterior of the coating. The order of these process steps can also be reversed.

In one embodiment of the present invention, a thin adhesion layer is deposited on the surface of the workpiece 20 before the crystalline and amorphous layer comprising metal and borons 22, 24 are deposited on the workpiece 20. Preferably, the adhesion layer comprises a metal layer such as titanium, zirconium, or chromium. In this embodiment, the preheated workpiece 20 is transported from the load lock chamber into a first deposition chamber where one or more metal sputtering targets are arranged facing the workpiece. The first deposition chamber is maintained at process conditions suitable for sputtering and depositing a metal layer onto the workpiece 20. A suitable sputtering gas, for example an inert gas such as argon or neon, is introduced into the first deposition chamber at a flow rate that provides a metal deposition rate of at least 50 Å/min, and more preferably at least about 200 Å/min. Preferably, the volumetric flow rate of the sputtering gas is from about 50 to about 200 sccm, more preferably from 80 to about 150 sccm. The chamber is maintained at a pressure ranging from about 1 mTorr to about 5 mTorr. Preferably, the thickness of the metal adhesion layer deposited on the surface of the workpiece 20 ranges from 200 Å to 2000 Å, and more preferably from 500 Å to 1000 Å.

When changing the process conditions from deposition of the crystalline layer 22 to deposition of the amorphous layer 24, the composition of the process gas which is being introduced in the chamber is gradually changed from the sputtering gas composition to the reactive gas composition, or vice versa. This gradual adjustment has been found to increase the compatibility between the crystalline layer 22 and the amorphous layer 24 by forming an interface layer 26 comprising a variable stoichiometry of metal and boron. For example, a sputter gas is introduced into the process chamber which is maintained at process conditions suitable for sputtering and depositing a crystalline layer on the workpiece. Once the desired thickness of the crystalline layer 22 is reached, a reactive gas is gradually introduced into the chamber in about 3 to about 60 seconds.

The number of alternating layers and the microstructure and thickness of each layer can be varied to provide coatings having different tribological properties depending on the desired application. In certain applications, a relatively small number of alternating layer combinations is sufficient to provide the needed wear protection. In other applications, a large number of layers may be necessary to provide the desired degree of wear resistance. In addition to the number of layers, the thickness of the individual crystalline and amorphous layer 22, 24 may also be varied. When each individual layer has a thickness between 50 Å and 1000 Å, the resultant coating provides good wear protection.

Figure 3:
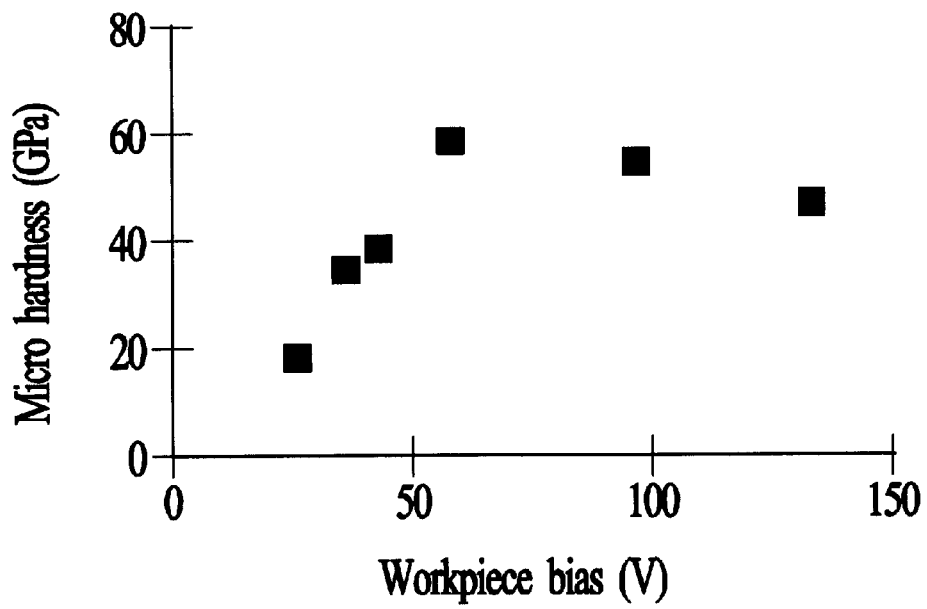
FIG. 3 is a graph showing the microhardness of crystalline titanium diboride for increasing substrate voltage bias.

The microstructure of the coatings comprising crystalline layers and amorphous layers 22, 24 were studied using X-Ray Diffraction (XRD) and High Resolution Cross-Sectional Transmission Electron Microscopy (XTEM). FIG. 3 illustrates the microhardness of crystalline titanium diboride layer as a function of the workpiece voltage bias. The hardness of crystalline $TiB_2$ layer increases with increasing of the substrate bias and reaches a maximum at the bias of 60V.

Figure 4:
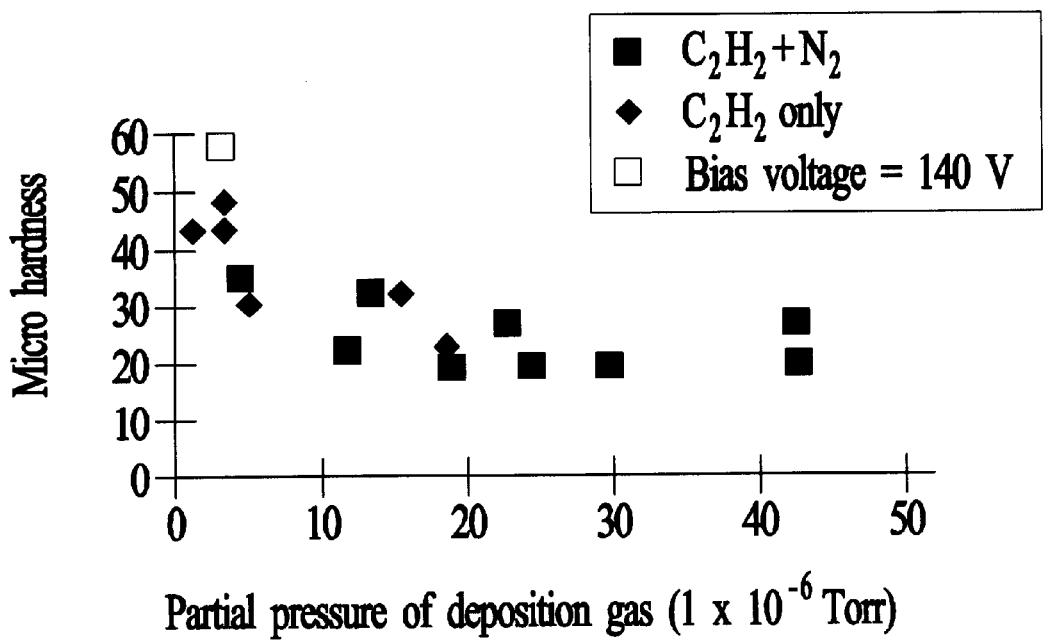
FIG. 4 is a graph showing the hardness of an amorphous layer comprising metal and boron as a function of the partial pressure of the reactive gas in the process chamber.

FIG. 4 illustrates the microhardness of an amorphous metal boride compound layer 24 as a function of the partial pressure of the reactive gas. In general, the amorphous layer 24 has a lower hardness value than the crystalline layer 22. The hardness of the amorphous 24 depends strongly on the partial pressure of the reactive gas. FIG. 4 shows that the addition of acetylene and nitrogen to the process gas produces a similar effect on the hardness of the coating.

The total hardness of the entire coating 30 ranges from about 15 to about 50 GPa. Several factors contribute to the hardness of the overall coating 30, such as the partial pressure of the sputter gas, workpiece RF bias level, sputtering target power, the number of alternating crystalline metal boride and amorphous metal boride, and the thickness of each layer. Typically, the crystalline layer 22 has higher hardness than the amorphous layer 24, and the amorphous layer 24 has lower coefficient of friction than the crystalline layer 22.

Figure 5:
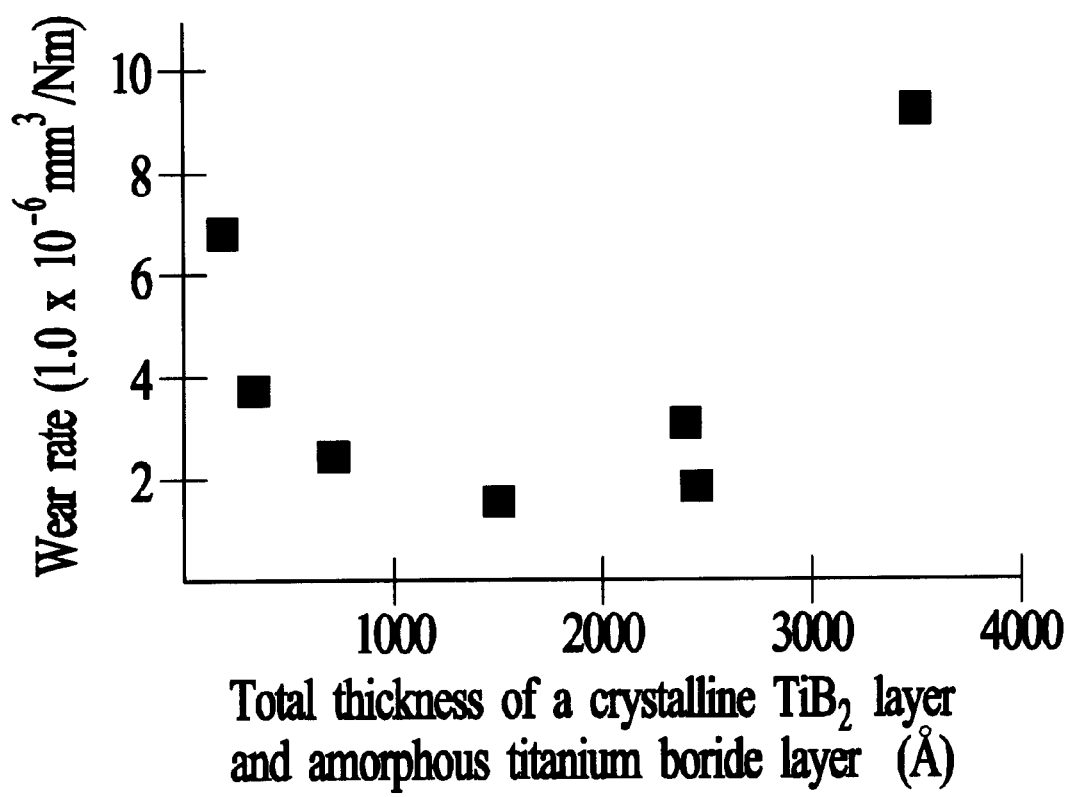
FIG. 5 is a graph showing the wear rate as a function of the total thickness of the crystalline layer and the amorphous layer.

A pin-on-disk wear test of the coatings was performed on a pin-on-disk tester in which a coated stainless steel disk slides against a ⅛" diameter stainless steel ball with a load of 3.5 N at a speed of 0.05 m/sec. As illustrated in FIG. 5, the wear rate depends strongly on the total thickness of a crystalline layer 22 and an amorphous layer 24. For example, coatings 30 with a total thickness between 1000 Å and 2000 Å have the lowest wear rates. Coatings with a total thickness of 1570 Å have a wear rate of only $1.5 \times 10^{-6}$ mm$^3$/nm, which is about 600 times lower than that of an uncoated sample.

The process of the present invention has significant advantages over conventional processes. First, the combined sputtering and deposition processes are particularly useful for forming homogeneous mixtures of different materials that are difficult to form using conventional processes. Moreover, the ability to perform sputtering and deposition processes in a single process chamber simplifies manufacturing process and prevents formation of native oxide films on the deposited layers when the workpiece is transferred from one chamber to another. This improves the yields and the wear reliability of the coatings.

EXAMPLE 1

In this example, a stainless steel disk was preheated by an infrared heater to about 100° C. in a load lock chamber in which the pressure was maintained at about $2 \times 10^{-5}$ Torr. The preheated disk was transported by a computerized conveyor system into a deposition chamber maintained at pressure of $5 \times 10^{-5}$ Torr. Two 5"×20" Ti targets were arranged facing the disk. Argon sputtering gas was introduced into the deposition chamber to sputter the titanium targets and deposit a 0.2 $\mu$m titanium layer on the disk.

The disk with the 0.2 $\mu$m titanium layer was then transported into another process chamber in which two pure dense TiB$_2$ sputtering targets were positioned facing the disk. Argon gas was introduced into the process chamber, and the process chamber was maintained at pressure of 1.5 mTorr. A thickness of 346 Å crystalline TiB$_2$ layer was deposited on the disk. Thereafter, in the sputtering/deposition process step, a reactive gas comprising nitrogen and acetylene was introduced into the same process chamber while maintaining the flow of argon gas. The partial pressure of acetylene was $2.1 \times 10^{-5}$ Torr, and the partial pressure of nitrogen was $2.4 \times 10^{-5}$ Torr. The partial pressure of the reactive gases was controlled by a PID control loop. The sputtering targets were maintained at a bias voltage of about −60 volt, and the current density was about 2 mA/cm$^2$. These process conditions provide a deposition rate of amorphous layer of about 1.5 $\mu$m/hr.

A total of 28 layers of crystalline TiB$_2$ and amorphous layer comprising titanium and boron were deposited on the stainless steel disk. X-ray transmission electron microscopy was used to determine the structure of the three layers, including the TiB$_2$ layers, the amorphous layers comprising titanium and boron, and the interface layers. The interface between the crystalline TiB$_2$ layer and the amorphous layer was very thin at about 10 Å, which is on the order of several atoms thick. The ultra-thin interface was probably formed when the deposition of one of the layers is stopped and the other layer commences. Thus the composition of the interface depends on the changing gas flow when switching from one deposition regime to another deposition regime.

The hardness of this coating was about 25 GPa. When sliding against a 1/8" diameter stainless steel ball with a load of 3.5 N at a speed of 0.05 m/sec, the coating exhibited a wear rate of $3.5 \times 10^{-6}$ mm$^3$/nm, which is about 250 times lower than that of an uncoated sample. This is an unexpected and surprising result, especially because the coating was found to strongly adhere to the underlying metal component with little or no flaking or peeling off, even after application of the strong shear forces during the wear tests.

Prospective Example

A workpiece coated with a coating comprising crystalline ZrB$_2$ layers and amorphous layers comprising zirconium and boron can also be prepared by using the same method as described in Example 1.

In this example, two 5"×20" Zr targets can be used in the sputtering stage to deposit a zirconium metal layer on a stainless steel disk. In the reactive deposition stage, two pure and dense ZrB$_2$ targets can be used to deposit crystalline ZrB$_2$ layers and amorphous layers comprising zirconium and boron on the disk. Process conditions can be varied to deposit interface layers between the crystalline and amorphous layers and to obtain the desired total number of layers of crystalline, amorphous, and interface layers.

The present invention has been described in considerable detail with reference to certain preferred versions thereof; however, the spirit and scope of the appended claims should not be limited to the description of the preferred versions contained herein.

What is claimed is:

1. A wear-resistant component comprising:
   (a) a workpiece; and
   (b) a coating on the workpiece, the coating comprising a crystalline layer comprising metal boride having the general formula MeB$_x$ where Me represents a metal and x represents 1 to 4, and the crystalline layer comprising a hardness of from about 20 to about 70 Gpa, and an amorphous layer comprising metal and boron.

2. The wear-resistant component as claimed in claim 1 wherein the crystalline layer comprises one or more of Fe$_2$B, TaB, TiB$_2$, and ZrB$_2$.

3. The wear-resistant component as claimed in claim 1 wherein the amorphous layer further comprises one or more of carbon, nitrogen, halogen, and hydrogen.

4. The wear-resistant component as claimed in claim 1 wherein the coating further comprises an interface layer between the crystalline layer and the amorphous layer.

5. The wear-resistant component as claimed in claim 4 wherein the interface layer comprises a variable stoichiometry of metal and boron.

6. The wear-resistant component as claimed in claim 1 further comprising an adhesion layer between the coating and the workpiece.

7. The wear-resistant component as claimed in claim 6 wherein the adhesion layer comprises elemental metal.

8. The wear-resistant component as claimed in claim 1 wherein the crystalline layer or the amorphous layer comprise a thickness of from about 10 to about 5000 Å.

9. A wear-resistant component comprising:
   (a) a workpiece; and
   (b) a coating on the workpiece, the coating comprising a plurality of composite layers, each composite layer comprising a crystalline layer comprising crystalline metal boride, and an amorphous layer comprising metal and boron.

10. The wear-resistant component as claimed in claim 9 wherein the coating comprises at least 4 composite layers.

11. The wear-resistant component as claimed in claim 9 wherein each composite layer comprises a thickness of at least about 20 Å.

12. The wear-resistant component as claimed in claim 9 wherein the crystalline layer comprises Fe$_2$B, TaB, TiB$_2$, or ZrB$_2$.

13. The wear-resistant component as claimed in claim 9 wherein the amorphous layer further comprises one or more of carbon, nitrogen, halogen, and hydrogen.

14. The wear-resistant component as claimed in claim 9 wherein each of the composite layer further comprises an interface layer between the crystalline layer and the amorphous layer.

15. The wear-resistant component as claimed in claim 9 further comprising an adhesion layer between the coating and the workpiece.

16. A wear-resistant component comprising:
   (a) a workpiece; and
   (b) a coating on the workpiece, the coating comprising a plurality of composite layers, each composite layer comprising a crystalline titanium diboride layer and an amorphous layer comprising titanium and boron.

17. The wear-resistant component as claimed in claim 16 wherein the coating comprises at least about two composite layers.

18. The wear-resistant component as claimed in claim 16 wherein the amorphous layer further comprises one or more of carbon, nitrogen, halogen, and hydrogen.

19. The wear resistant component as claimed in claim 16 wherein each composite layer comprises a thickness of at least about 20 Å.

20. The wear-resistant component as claimed in claim 16 wherein each composite layer further comprises an interface layer between the crystalline titanium diboride layer and the amorphous layer comprising titanium and boron, the interface layer comprising titanium, boron, or mixtures thereof.

21. The wear-resistant component as claimed in claim 16 further comprising an adhesion layer between the coating and workpiece.

22. A wear-resistant component comprising:
   (a) a workpiece; and
   (b) a coating on the workpiece, the coating comprising a plurality of composite layers, each composite layer comprising a crystalline titanium diboride layer and an amorphous layer comprising titanium and boron.

23. The wear-resistant component as claimed in claim 22 further comprising an adhesion layer between the coating and workpiece.

24. The wear-resistant component as claimed in claim 22 wherein each composite layer comprises a thickness of at least about 20 Å.

25. A wear-resistant component comprising:
   (a) a workpiece; and
   (b) a coating on the workpiece, the coating comprising a plurality of composite layers, each composite layer comprising a crystalline metal diboride layer and an amorphous layer comprising metal and boron.

26. The wear-resistant component as claimed in claim 25 wherein each composite layer further comprises an interface layer between the crystalline metal diboride layer and the amorphous layer comprising metal and boron, the interface layer comprising titanium, boron, or mixtures thereof.

27. The wear-resistant component as claimed in claim 22 wherein the amorphous layer further comprises one or more of carbon, nitrogen, halogen, and hydrogen.

28. The wear-resistant component as claimed in claim 22 wherein the coating further comprises an interface layer between the crystalline titanium diboride layer and the amorphous layer.

29. The wear-resistant component as claimed in claim 28 wherein the interface layer comprises a variable stoichiometry of metal and boron.

30. The wear-resistant component as claimed in claim 23 wherein the adhesion layer comprises elemental metal.

31. The wear resistant component as claimed in claim 25 wherein the crystalline metal diboride layer comprises titanium diboride.

32. The wear-resistant component as claimed in claim 25 wherein the amorphous layer further comprises one or more of carbon, nitrogen, halogen and hydrogen.

33. The wear-resistant component as claimed in claim 25 further comprising an adhesion layer between the coating and the workpiece.

34. The wear-resistant component as claimed in claim 25 wherein each composite layer comprises a thickness of at least about 20 Å.

* * * * *